United States Patent [15] 3,646,448

Harmon, Jr. et al. [45] Feb. 29, 1972

[54] QUADRATURE INJECTION CONTROL CIRCUIT

[72] Inventors: Samuel T. Harmon, Jr.; Kenneth E. Monroe, both of Ann Arbor, Mich.

[73] Assignee: Datamax Corporation, Ann Arbor, Mich.

[22] Filed: Feb. 16, 1970

[21] Appl. No.: 11,379

[52] U.S. Cl. ..................................325/326, 325/41, 325/50, 325/60, 325/329

[51] Int. Cl. ..........................................................H04b 1/16

[58] Field of Search ..................179/15 BC; 325/49, 60, 326, 325/329, 331, 346, 367, 369, 407, 408, 409, 344, 349, 41, 50, 395; 332/49

[56] References Cited

UNITED STATES PATENTS

| | | | |
|---|---|---|---|
| 2,943,193 | 6/1960 | Webb | 325/331 |
| 3,101,448 | 8/1963 | Costas | 325/329 |
| 3,134,855 | 5/1964 | Chasek | 325/49 |

*Primary Examiner*—Benedict V. Safourek
*Assistant Examiner*—Albert J. Mayer
*Attorney*—McGlynn, Reising, Milton & Ethington, Martin J. Adelman, Allen M. Krass, Owen E. Perry, Thomas N. Young and Stanley C. Thorpe

[57] ABSTRACT

A data signal communication system including an analog signal transmitter and a receiver for converting thc analog signal levels to digital form. The receiver employs an automatic gain control loop including means for generating an error signal related to the difference between the analog input and the analog equivalent of a digital output. The error signal is used to control both loop gain and the quantity of a quadrature component which is combined with the data signal within the automatic gain control loop.

12 Claims, 2 Drawing Figures

Figures 1, 2:
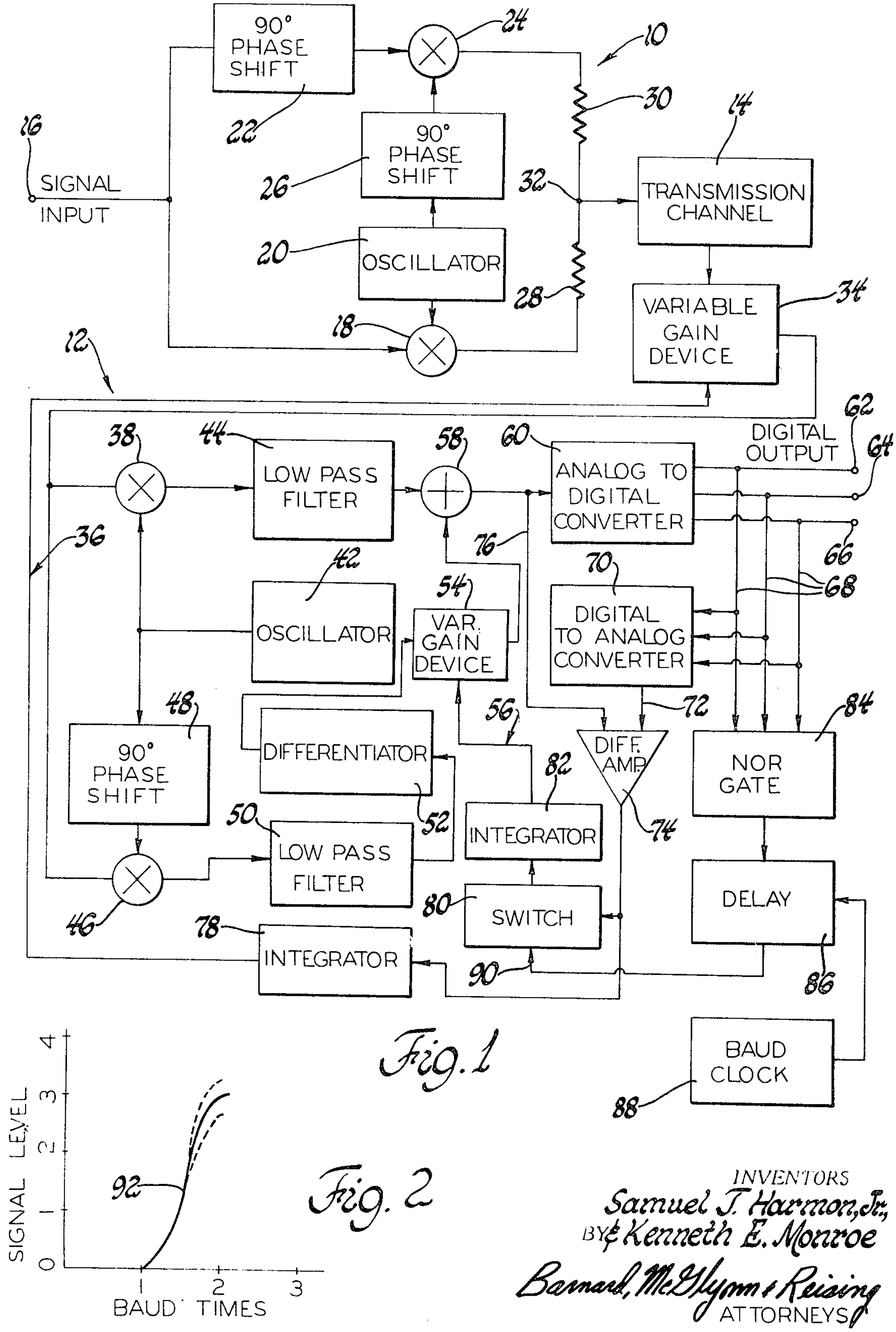

INVENTORS
Samuel J. Harmon, Jr.,
Kenneth E. Monroe
BY Barnard, McGlynn & Reising
ATTORNEYS

QUADRATURE INJECTION CONTROL CIRCUIT

This invention relates to data signal transmission systems and more particularly to a receiver employing error signal controlled quadrature component injection to improve the signal detection function.

The copending application for U.S. Pat. Ser. No. 803,788 filed Mar. 3, 1969 discloses a data transmission system in which a single sideband suppressed carrier data signal is generated and transmitted over a communication channel such as a voice quality telephone line. At the detector a quadrature component of the data signal is generated, differentiated, and combined with the original signal in varying degrees to achieve maximum data recovery or detection from the received signal. The quadrature signal-combining function, while usually multiplication or addition, is commonly referred to as "injection". The actual quantity of the quadrature signal so injected is usually determined by manual adjustment of circuit elements such as resistors to achieve the maximum signal recovery. Therefore, a more or less trial and error technique must often be employed.

The present invention also relates to data signal transmission and reception and also involves quadrature component injection at the receiver but further provides for the control of the injection signal quantities by means of an error signal generated in response to the received signal levels. Accordingly, the quadrature component injected may be continuously varied in quantity so as to continuously produce optimum signal detection and data recovery at the receiver.

In a specific form, the invention includes an automatic gain control loop which provides an error signal to vary loop gain according to the degree of coincidence between the incoming signal levels and predetermined reference levels. This same error signal, or selected portions thereof, may be employed in a second loop within the gain control loop to vary the injected quantity of the quadrature component.

In the preferred embodiment, the AGC loop employs an analog-to-digital conversion for providing digital output signals, digital-to-analog conversion to provide analog equivalent signals, and a difference amplifier to generate the error signal as a function of the difference between the input analog signal levels and the analog equivalents. The error signal is integrated to provide the loop gain control and selected portions of the error signal are integrated to provide the quadrature signal injection control. Further features and advantages of the subject invention will become more apparent upon reading the following specification which describes an illustrative embodiment of the invention. This specification is to be taken with the accompanying drawing of which:

FIG. 1 is a block diagram of the preferred embodiment of the subject invention and, FIG. 2 is a graph of input signal level versus time for the preferred embodiment and illustrates the effect of the invention in the embodiment during a single input signal level excursion.

Referring to FIG. 1 there is shown a data signal transmission system including a transmitter 10 and a receiver-detector 12 coupled by means of a transmission channel 14 such as a voice quality telephone line. The transmitter 10 is adapted to produce a single sideband, suppressed carrier, amplitude modulated signal wherein the amplitude levels occur in sequential, substantially periodic fashion and represent data applied to an input terminal 16. The receiver 12 is adapted to receive and detect the data signal and to provide a digital output representing the analog data level in digital form on the output terminals 62, 64, and 66.

The transmitter 10 includes a product multiplier 18 which receives as inputs the sequential chain of data from terminal 16 and the output of a carrier-oscillator 20. The input data chain is also applied through a 90° phase shift circuit 22 to a second product multiplier 24. Multiplier 24 receives as inputs the phase shifted data chain as well as a 90° phase shifted version of the signal from oscillator 20, the latter phase shift being accomplished by means of a phase shift circuit 26 connected between the oscillator 20 and the multiplier 24. The output of product multipliers 18 and 24 are applied to a pair of summing resistors 28 and 30, respectively, each having an end connected to a summation terminal 32 which in turn is connected to the input end of the transmission channel 14. Accordingly, the transmitter 10 produces a single sideband suppressed carrier analog signal representing the input data chain. Other transmitters may be used in a system incorporating the present invention. The circuit 10 just described is, therefore, illustrative of only one usable arrangement.

After transmission over the channel 14, the single sideband data signal is applied to the receiver 12 where it is detected and from which data is recovered in accordance with the invention. The receiver 12 includes first a variable gain amplifier device 34 which is controlled by means of a gain control loop generally designated at 36. The output of the variable gain amplifier device 34 is connected as a first input to a first product multiplier 38. A second input to the product multiplier 38 is received from the local oscillator 42, thus, to permit recovery of the amplitude modulations from the suppressed carrier signal. The output of the variable gain amplifier device 34 is also connected as a first input to a second product multiplier 46. The second inputs of the product multiplier 46 is a 90° phase shifted version of the signal from oscillator 42 and is provided by connecting the output of the oscillator 42 through a 90° phase shift circuit 48. Accordingly, the quadrature component of the input data signal is derived first from the multiplication of the input data signal with the phase shifted signal received from the phase shift circuit 48. The product outputs of the multipliers 38 and 46 are connected through low-pass filters 44 and 50, respectively, to remove the carrier frequency component from the product signals. The output of low-pass filter 50 is connected through a differentiator circuit 52 to the input of a variable gain device 54 which, as will be subsequently described, operates as a multiplier to control the injected quantity of the quadrature component produced by the combination of product multiplier 46 low-pass filter 50, and differentiator 52.

The output of low-pass filter 44 is connected through an adder 58 to the input of an analog-to-digital converter 60. Converter 60 has output lines ending in terminal 62, 64, and 66 on which appear the digital signals representative of the analog inputs to converter 60. Terminal 62 may, for example, represent the "fours " column, terminal 64 the "twos" column and terminal 66 the "ones" column in binary code.

The output lines of converter 60 are tapped by lines 68 and applied to the inputs of a digital-to-analog converter 70 which performs an operation which is essentially the inverse of that performed by the converter 60 and, thus, produces on output 72 and analog equivalent of the digital signal produced by the converter 60. This analog equivalent signal on output 72 is applied as one input to a differential amplifier 74. The other input to the differential amplifier is the input analog signal level appearing on line 76. The output of the differential amplifier 74 is, thus, an error signal derived from a comparison between the analog equivalent of the exact digital signal produced by the converter 60 and the input analog signal to the converter 60 which resulted in the production of that analog equivalent. The error signal in its entirety is applied through an integrator 78 to the control input of the variable gain amplifier device 34 to control the gain of the loop 36 so as to minimize the error signal. The integrator 78 is employed to time average the error signals over a number of baud times. For a more exhaustive disclosure of the AGC loop 36 disclosed in FIG. 1, reference may be taken to the copending U.S. application Ser. No. 10,771 filed Feb. 12, 1971 in the names of Kenneth E. Monroe and Samuel T. Harmon, Jr. and assigned to the assignee of this application.

A selected portion of the data error signal from differential amplifier 74 is applied to the variable gain device 54 through the series combination of the controlled switch 80 and the integrator 82. Switch 80 is normally open but is closed for one baud time following the occurrence of a predetermined input signal level; namely, that input signal level which results in a digital "zero" indication on each of the terminals 62, 64, and 66. Following such an occurrence, switch 80 is closed to apply the error signal through the integrator 82 to the variable gain device 54 where the error signal modulates or varies the quantity of the quadrature component applied to the device 54 from the output of the differentiator 52. The product signal is, thus, applied from the output of variable gain multiplier 54 to the second input of adder 58 which thereby functions to combine the modulated quantity of the quadrature signal with the original analog signal levels emerging from low-pass filter 44. In short, the device 54 modifies the quantity of the quadrature component signal to be injected in accordance with the AGC error signal portion passed by switch 80 and the adder 58 combines the error signal modulated quadrature components with the original analog level to improve the data level detection function.

The control of switch 80 is accomplished by connecting the digital output lines 68 to a NOR-gate 84. The output of the NOR-gate 84 is low if any of the signals on the input lines is a "one". Otherwise if all of the input signal lines are "zero" the output of the NOR-gate 84 is a "one". This "one" signal is applied through a one baud time delay circuit 86 which operates under the control of a baud clock 88 and from the delay over line 90 to the control input of switch 80.

The functional result of the subject invention is generally illustrated in FIG. 2 wherein the curve 92 indicates an analog signal level excursion from a "zero" level to a "three" level during the second baud time. Without quadrature injection quantity control the signal excursion may undershoot or overshoot the third level by a small amount as indicated in FIG. 2. However, because this lack of correspondence between the ideal and actual signal level tends to be cumulative with time, the effect within several baud times may be to produce an erroneous digital signal. For example, the converter 60 may produce a digital "three" in response to an analog input level of "two". Accordingly, to prevent this from occuring, the switch 80 is closed for one baud time following the occurrence of a "zero" digital output signal on lines 68. The quadrature signal injection is, thus, subjected to error signal control during that baud time, less quadrature signal being injected if the error signal is positive and more quadrature signal being injected if the error signal is negative. Accordingly, the input analog signal level is modified in amplitude to correspond more closely to the analog equivalent, thus, to improve the data recovery process.

Although the operation of the circuit of FIG. 1 is believed to be apparent from the foregoing specification, a brief review will now be made.

The data to be transmitted is applied to the transmitter 10 via line 16. The data may be generated in digital form by a business machine or the like and encoded, for example, according to a convolutional code to produce a degree of redundancy for error detection purposes. The encoded data is then converted to voltage levels which are the analogs of selected digit groups in the encoded data. The transmitter 10 produces a single sideband suppressed carrier output signal modulated according to the analog input levels.

At the receiver 12, the data signal is detected and applied to the converter 60 for conversion to binary coded digital form. The AGC loop 36 operates to compare the analog input levels to the analog equivalents of the digital signals generated in converter 60 and to produce an error signal reflective of any difference which results. The error signal from amplifier 74 is integrated with respect to time at integrator 78 and applied to the variable gain device 34. Loop gain is, thus, controlled to minimize the error signal.

At the same time, the portion of the error signal from amplifier 74 immediately following the receipt of a digital "zero" signal on terminals 62, 64, and 66 is integrated at 82 and applied to multiplier 54 to vary the quantity of the quadrature signal component to be added to the data signal in adder 58. Thus, the quadrature injection control loop lies entirely within the AGC loop 36.

It is to be understood that the foregoing description relates to an illustrative embodiment and is not to be construed in a limiting sense.

The embodiments of the invention in which an exclusive property or privilege is claimed are defined as follows:

1. A data signal receiver comprising in combination; means for receiving a carrier-modulated data signal in the form of an amplitude modulated analog signal in which the data appears as sequentially arranged signal levels, means for deriving a quadrature component of the data signal, means for variably combining the quadrature component with the data signal under the control of an error signal generated in response to received signal levels, means for comparing the data signal to at least one reference value to derive the error signal, and means for combining the error signal with the quadrature component to vary the quantity thereof combined with the data signal, the means for comparing comprising first converter means for converting the data signal to predetermined digital signals, second converter means for reconverting the digital signals to analog equivalents thereof, and means for deriving the error signal as a function of the difference between the analog data signal and said analog equivalents.

2. Apparatus as defined in claim 1 wherein the means for deriving the quadrature component includes a first product multiplier connected to receive as inputs the data signal and a local oscillator signal, and a second product multiplier connected to receive as inputs the data signal and a 90° phase-shifted equivalent of the local oscillator signal.

3. Apparatus as defined in claim 2 wherein the means for deriving the quadrature component further comprises differentiator means connected to receive the output of the second product multiplier.

4. Apparatus as defined in claim 3 wherein the means for variably combining the quadrature component with the data signal comprises a third product multiplier connected to receive as inputs the output of the differentiator means and the error signal, and means for adding the output of the third multiplier to the output of the first multiplier.

5. Apparatus as defined in claim 4 including gain control means responsive to the error signal to vary the magnitude of the data signal applied to the first and second product multipliers.

6. Apparatus as defined in claim 5 including selector means for applying only selected portions of the error signal to the third multiplier means.

7. Apparatus as defined in claim 6 wherein the selector means includes a switch connected between the means for deriving the error signal and the third multiplier, and control means responsive to the digital signals to control the switch.

8. Apparatus as defined in claim 7 wherein the control means responds only to a minimum level digital signal to close the switch for a period substantially equal to the duration of one analog signal level in the data signal.

9. Apparatus as defined in claim 8 including integrator means connected between the switch and the third multiplier.

10. Apparatus as defined in claim 9 including integrator means connected between the means for deriving and the gain control means.

11. Apparatus as defined in claim 10 wherein the data signal is a single sideband suppressed carrier signal.

12. Data receiver apparatus comprising in combination: detector means for receiving an analog data signal, an automatic gain control loop for controlling the magnitude of the data signal and producing a gain controlling error signal, means for deriving a quadrature component of the data signal, and circuit means within the automatic gain control loop for variably combining the quadrature component with the data signal under the control of at least a portion of the error signal, the automatic gain control loop including an analog-to-digital converter for producing digital levels in response to the data signal, a digital-to-analog converter for producing analog equivalents of the digital levels, and difference amplifier means for deriving the error signal according to the difference between the data signal and the analog equivalents.